United States Patent [19]

DeLeon

[11] Patent Number: 4,870,687
[45] Date of Patent: Sep. 26, 1989

[54] ORAL READOUT RANGEFINDER

[76] Inventor: Andrew M. DeLeon, 32 Tulip Grove Dr., Lake Grove, N.Y. 11755

[21] Appl. No.: 649,138

[22] Filed: Sep. 10, 1984

[51] Int. Cl.$^4$ .......................... G10L 5/04; G01B 7/02; G01S 15/08

[52] U.S. Cl. ...................................... 381/51; 367/116; 364/561

[58] Field of Search .................. 367/116, 99, 107–108; 342/115, 118; 381/51–53; 364/513.5, 556, 561–563

[56] References Cited

U.S. PATENT DOCUMENTS

| | | | |
|---|---|---|---|
| 3,321,737 | 6/1967 | Russell | 367/116 |
| 3,528,053 | 9/1970 | Rubin | 367/108 |
| 3,942,149 | 3/1976 | Westfall | 367/108 |
| 4,135,188 | 1/1979 | Bickley, Jr. et al. | 342/115 |
| 4,234,941 | 11/1980 | Welland, Jr. et al. | 367/116 |
| 4,266,096 | 5/1981 | Inoue et al. | 381/51 |
| 4,307,611 | 12/1981 | Opara | 367/108 |
| 4,400,582 | 8/1983 | Takeda et al. | 381/51 |
| 4,439,846 | 3/1984 | Rodriguez | 367/99 |
| 4,672,590 | 6/1987 | Tendler | 367/116 |
| 4,727,310 | 2/1988 | Hashimoto et al. | 364/710 |

OTHER PUBLICATIONS

Smith, "Single Chip Speech Synthesizers", *Computer Design*, vol. 17, No. 11, Nov. 1978, pp. 188–192.
Master Specialties Company, "Give Your Equipment a Voice in its Operation", Oct. 1974, pp. 1–4.

Primary Examiner—Gary V. Harkcom
Assistant Examiner—John A. Merecki
Attorney, Agent, or Firm—Leonard Belkin

[57] ABSTRACT

A system for measuring the distance to an object and orally announcing the measured distance by use of a speech synthesizer. The system includes a transmitter, a receiver, and a transmit/receive transducer operating at an ultrasonic frequency. The round trip time from generation of impulse to receipt of the echo reflected from an object is measured using a counter. The counter directly accesses a memory that contains the information needed to select the correct combination of words to be synthesized for the corresponding measured distance. The required vocabulary producing natural sounding speech is stored in a second memory within the speech synthesizer.

4 Claims, 2 Drawing Sheets

ORAL READOUT RANGEFINDER

BACKGROUND OF THE INVENTION

This invention relates generally to the field of distance measuring systems, and more specifically to the field of measuring systems with audible annoucement of distance to a desired object or target and to such systems which require little operator intervention.

There are many applications for distance measuring equipment. For example, at the current state-of-the-art there is no safe way for a driver to back up a large vehicle and observe a human or any obstructing object located in the "blind spot" inherent to all vehicles and particularly troublesome to trucks. A closed circuit television system has been used; however, this system requires that the driver divert his attention to observe a television screen and, therefore, presents a safety hazard. Additionally, the prohibitive cost of a CCTV system makes it avaialable to a limited number of truck owners.

Another application is a system with audible output designed as a sensory aid for use by a sightless person.

A number of inventions have already been provided in the field of audible output distance measuring systems. F. Welland (U.S. Pat. No. 4,234,941) provides a verbal readout depth sounding system, and E. Bickley, Jr. et al (U.S. Pat. No. 4,135,188) provides a method and apparatus for orally announcing vehicle speed; however, both inventions are unsuitable for the intended purpose of this invention. The Welland invention is designed primarily to measure depth in a fluid medium and the Bickley invention measures velocity whereas the instant invention measures distance. Importantly, both Bickley and Welland use a scheme for selecting the words to be synthesized in which the outputs from the measuring device are separated into a tens digit and a units digit and then each is synthesized, thereby producing a generalized two-digit number so that 25 would be vocalized as "two five".

L. Russell (U.S. Pat. No. 3,321,737) provides sonar-type sensory aids which measure distance but provides 5 output tones and not synthesized speech at all. M. Rodriquez (U.S. Pat. No. 4,439,8640) provides a sonar rangefinder system whose output controls, typically, servo type camera setting functions but no audible verbal readings. Finally, W. Westfail, Jr. (U.S. Pat. No. 3,942,149) provides a solid state depth finder which provides a visual readout of depth in a fluid medium.

SUMMARY OF THE INVENTION

The present invention makes it possible to produce a miniaturized and economical yet reliable and easy to use apparatus for measuring and vocalizing distances to a target in situations where prior arrangements have not been feasible or practical.

In accordance with a preferred embodiment of this invention, there is provided transmitting and receiving apparatus for producing pulsed radiation and detecting wave fronts reflected from a target, and timing and control circuitry for producing clocked pulses for initiating the transmitting and receiving apparatus and simultaneously producing a START OF MEASUREMENT (SOM) signal followed by an END OF MEASUREMENT (EOM) signal upon receiving a reflected wave front. A logic circuit is provided which comprises a latch and an AND gate. The latch receives the SOM and EOM signals while the AND gate receives the output of the latch and clocked pulses from the timing and control circuit so that the gate passes only clocked pulses during the interval between the SOM and EOM signals reflecting the time elapsing between the transmitted pulse and the return of its reflected wave from the target.

A time-to-distance converter takes the clocked pulses from the AND gate and increments a binary distance equivalent to the number of pulses passing through the AND gate. The control memory, under sequence control by the timing and control means, is a READ ONLY MEMORY (ROM) in which is stored a series of addresses corresponding to the locations in a speech memory and synthesizer where words to be synthesized are stored. The speech memory and synthesizer are directed by signals from the timing and control means to output the selected words stored in its memory in the order determined by the control memory.

In the arrangement just described the oral readout can be natural sounding such as "thirty nine" instead of "three nine" as is found in prior arrangements. In addition, the present invention permits the use and substitution of speech synthesizer modules to allow programming in any foreign language and the mixing of numbers and words, such as "thirty nine meters".

It is, therefore, a primary object of the present invention to provide an oral readout rangefinder which incorporates the flexibility of a look-up table which allows selection of a large vocabulary of numbers and words in order to satisfy specific measurement requirements.

Another object is to provide an oral readout rangefinder in which the audible output may include both numbers and words.

Another object is to provide an oral readout rangefinder in which the audible number output is given in normal speech form, i.e., "thirty nine" and not "three nine".

Yet another object is to provide an oral readout rangefinder which is capable of using plug-in speech synthesizer modules to allow programming in any foreign language.

A yet further object is to provide an oral readout rangefinder in which any distance scaling factor may be used so that distances may be measured in any distance measuring unit such as feet, meters, etc.

A yet further object is to provide an oral readout rangefinder which requires little or no operator intervention and is capable of such miniaturization as to permit carrying by and on the person of an individual.

A still further object is to provide an oral readout rangefinder which is inexpensive enough to fabricate to allow common use.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

DETAILED DESCRIPTION OF THE PREFERRED EMBODIMENTS

Figure 1:
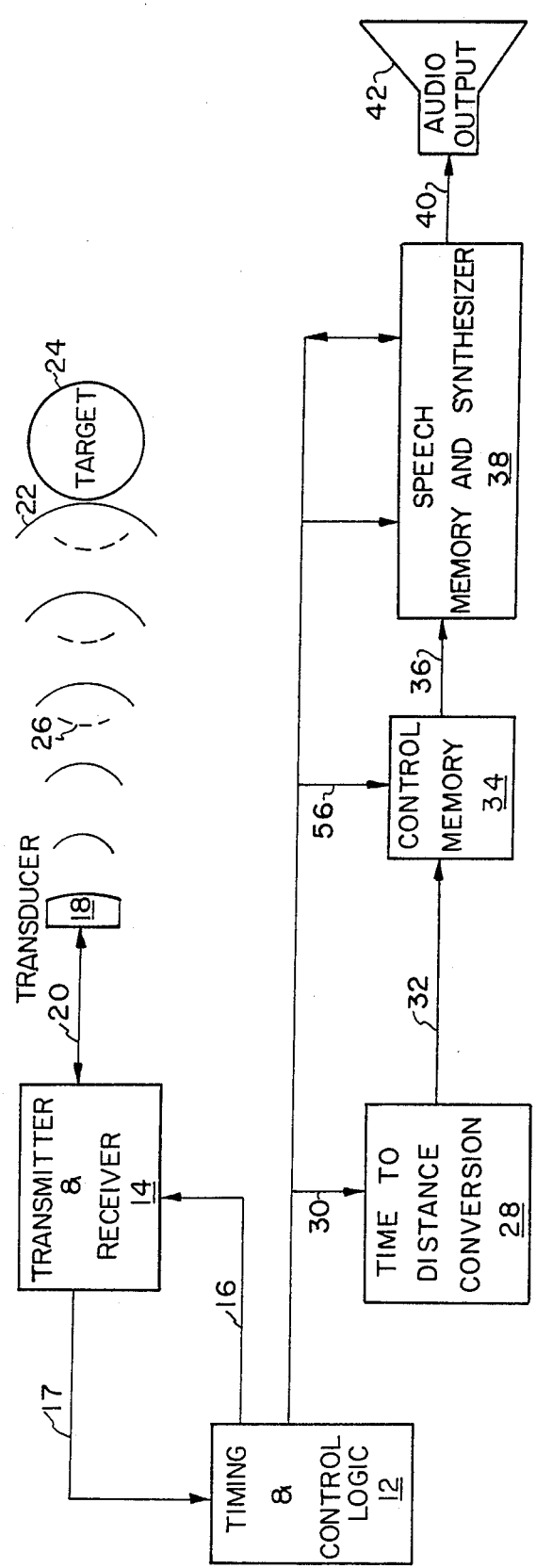
FIG. 1 is an overall or generalized electronic block diagram of the entire invention.

The overall operation of the invention may best be understood with reference to the system shown in FIG. 1. Timing and control logic 12 directs the sonic rangefinger consisting of combination transmitter and receiver 14 and transducer 18 via control line 16 to transmit an electronic pulse to bidirectional transducer 18 via control line 20. Such rangefinders are well known in the art as shown in the aformentioned patent to Rodriquez. Bidirectional transducer 18 emits an ultrasonic pulse which creates wave fronts typified by 22 which strike target 24. Reflected wave fronts, typified by 26, strike bidirectional transducer 18 which converts the wave front into an electrical pulse which is detected and amplified by combination transmitter and receiver 14 and routed to the timing and control logic circuit 12 via control line 17. At the same time, a stable digital clock contained in timing and control logic 12 increments a timer inside time-to-distance converter 28 via control line 30 for the time duration between the initiation of the transmitted pulse 22 and the reception of the reflected pulse 26.

Time-to-distance converter 28 then converts this time interval to a binary distance equivalent according to a predetermined algorithm. The output of time-to-distance converter 28 is fed via address bus 32 to control memory 34 which serves as a look-up table. As the time-to-distance converter 28 is incremented during the time interval, the look-up table contained in control memory 34 is also incremented, so that if, for example, the measured distance is forty-two feet, the look-up table would have been incremented through forty feet, forty one feed to forty two feet. The three addresses representing this three-word output would then be fed via address bus 36 to speech memory and synthesizer 38 in sequence of the three words: "forty", then "two", then "feet". The output of speech memory and synthesizer 38 would then be fed via output line 40 to audio output speaker 42. The use of such an expression "forty two feet" is considered herein as natural sounding speech as compared to the expression "four two feet".

Figure 2:
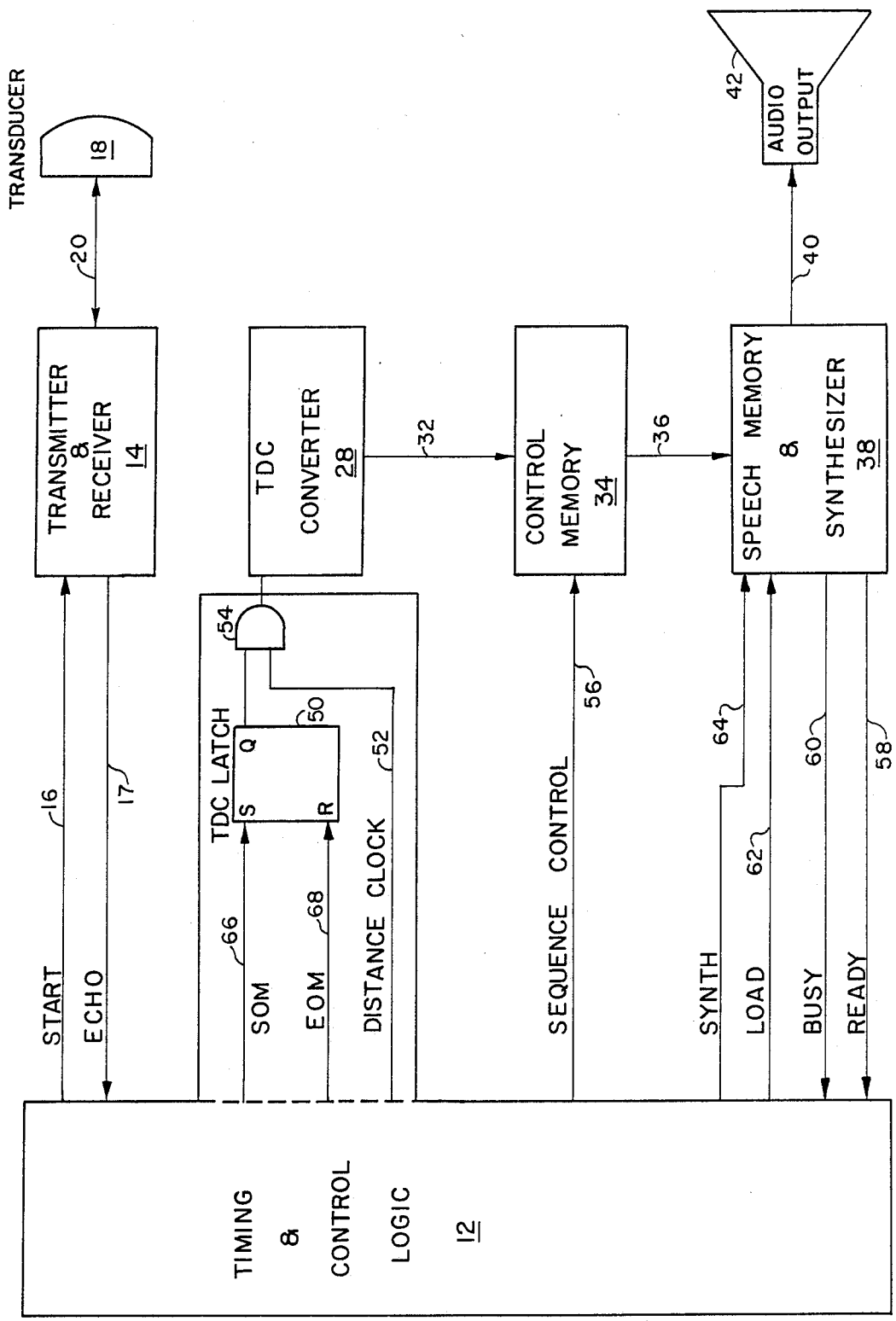
FIG. 2 is a more detailed electronic block diagram of the invention showing the control logic involved.

The detailed operation of the novel distance vocalizing circuitry may best be understood with reference to FIG. 2. A START pulse on control line 16 initiates the transmit portion of combination transmitter/receiver 14 to send a pulse via control line 20 to directional transducer 18. At the same time a START OF MEASUREMENT (SOM) pulse on control line 66 sets time-to-distance converter latch 50. The clock output on line 52 and the enabled output of latch 50 appear at the inputs of AND gate 54 and increments time-to-distance converter 28. Each increment of time is converted to an increment of distance by a conversion algorithm. The distance increments are transmitted via address bus 32 to control memory 34 which also increments through distance numbers and words as already described. When the received echo is detected and sent to timing and control circuit 12 via control line 17 an END OF MEASUREMENT (EOM) signal on line 68 is transmitted to time-to-distance converter latch 50 producing a "0" output on AND gate 54 and time-to-distance converter 28 stops incrementing.

A sequence control signal is then transmitted to control memory 34 from timing and control circuit 12 via control line 56 and the first address of a typical sequence of words is transmitted via address bus 36 to speech memory and synthesizer 38.

READY control line 58 is normally activated when the synthesizer 38 is inactive, that is, waiting for a word. BUSY control line 60 is activated when synthesizer 38 is outputting or loading a word. LOAD control line 62 tells synthesizer 38 to load into its memory address register a word present on address bus 36 from control memory 34. SYNTH control line 64 tells synthesizer 38 to output the selected word stored in its memory. When the last word in the sequence has been annunciated the entire process restarts with the transmission of a START pulse on control line 16 and a START OF MEASUREMENT pulse on control line 66.

As previously noted, an important feature of this invention is the production of an audible output which is natural sounding speech. For the details of how this is accomplished, reference is made to FIG. 3.

The Speech Memory (SM) included in speech memory and synthesizer 38 stores all of the words to be synthesized. Each word is assigned as illustrated a memory address which is used to retrieve that word when it is needed.

The Control Memory (CM) in 34 stores the SM word addresses for each sequence of words to be vocalized. For example, if the TDC were to measure a distance of 23 inches, it would be selecting the CM address corresponding to that distance. The memory contents at that address would be the SM addresses I, C, and K. The sequence control would first select address I in the SM (shown by line a) and the Synthesizer would vocalize the word corresponding to address I. In this case the word is "twenty". Folowing the outputting of "twenty", the sequence control would then selected address C in the SM (line b) and the word "three" would be synthesized. Finally, address K would be selected (line c) and the word "inches", that is, the units involved, would be outputted. Following the last word, the synthesizer would return to its inactive state and the control logic would be free to initiate another measurement cycle. It is thus seen that CM functions as a look-up table.

Figure 3:
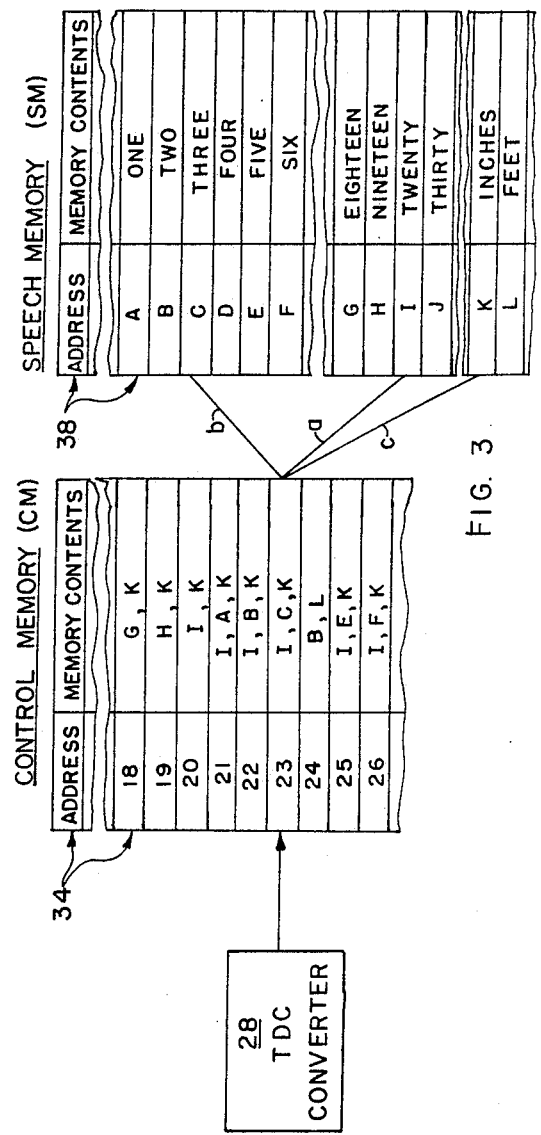
FIG. 3 shows schematically the look-up table in the control memory and the locations addressed in the speech memory and synthesizer.

It should also be noted, referring to FIG. 3, if the distance were 24 inches the CM could contain the SM address B and L, and this distance could be vocalized as "two feet" rather than "twenty-four inches".

Speech memory and synthezier circuit 38 may be a replaceable module containing one or more chips and programmed to produce outputs in various languages. Likewise different conversion algorithms may be incorporated in the time-to-distance converter 28 for different scaling units as, for example, metric conversions.

While certain novel features of this invention have been shown and described and are pointed out in the annexed claims, it will be understood that various omissions, substitutions, and changes in the forms and details of the device illustrated and in its operation can be made by those skilled in the art without departing from the spirit of the invention as defined in the claims which follow.

What is claimed is:

1. An ultrasonic ranging system with synthesized voice output, comprising
   a. means for transmitting a radiation pulse to and receiving a reflection thereof from a target;
   b. timing and control means for producing clocked pulses and a clocked start pulse for initiating said transmitting and receiving means and simultaneously initiating a START OF MEASUREMENT (SOM) signal;
   c. said timing and control means including means for initiating and END OF MEASUREMENT (EOM) signal when said reflected pulse is received by said receiving means;
   d. a latch means set by said SOM signal and reset by said EOM signal;
   e. an AND gate enabled by the output of said latch and said clocked pulses, whereby said AND gate passes a clocked pulse output during the period of time elapsing between said SOM and EOM signals;
   f. time-to-distance converter means for converting said clocked pulse output received from said AND gate into a binary signal representing the distance between said transmitting and receiving means and said target;
   g. control memory means for storing addresses for each sequence of words to be vocalized and for selecting and outputting said addresses in response to said binary signal received from said time-to-distance converter means;
   h. a speech memory and synthesizer, including means for storing at address identified in said control memory means, encoded distance and unit words designated by said addresses from said control memory means and for converting said encoded distance and unit words into natural sounding speech;
   i. said timing and control means including means for producing signals to instruct said speech memory and synthesizer to output said distance and unit words in natural sounding speech and for producing signals to instruct said speech memory and synthesizer to use said encoded distance and unit words coded data at the addresses received from said control memory means;
   j. means to for converting said natural sounding speech into an audible speech sound pattern;
   k. said timing and control means including means for producing signals to sequence the operation of said transmitting and receiving means, said time-to-distance converter means, said control memory means, and said speech memory and synthesizer;
   l. said speech memory and synthesizer including means for producing an annunciation complete signal when said audible speech sound pattern has been generated; and
   m. means for initiating said transmitting pulse in response to said annunication complete signal from said speech and memory synthesizer.

2. The ranging system of claim 1 in which said speech memory and synthesizer delivers a READY signal to said timing and control means when the former is inactive.

3. The ranging system of claim 2 in which said speech memory and synthesizer delivers a BUSY signal to said timing and control means when said speech memory and synthesizer is outputting or loading said encoded distance and unit words.

4. An apparatus for determining and annunciating a range distance comprising:
   transducer means for transmitting a pulse and receiving an echo of said transmitted pulse;
   means for producing a clocked pulse train;
   means for determining the number of pulses produced by said clocked pulse train producing means during the interval between a transmitted pulse and a signal from said transducer means indicating the detection of the echo of said transmitted pulse;
   a synthesizer containing vocalization command codes for causing said synthesizer to generate predetermined human voice simulations;
   a time-to-distance converter, comprising a table-lookup memory containing the addresses of said vocalization commands within said synthesizer;
   means for accessing said table-lookup memory as a function of the number of clocked pulses occurring between said transmission and echo pulse reception;
   means for synthesizing a human voice in response to said vocalization command codes called up from said synthesizer in response to addresses received from said table-lookup memory; and
   means for causing said transducer to transmit a new pulse at the completion of an annunciation of a deteremined range.

* * * * *